United States Patent
Shah et al.

(10) Patent No.: US 10,713,016 B1
(45) Date of Patent: Jul. 14, 2020

(54) METHOD OF IMPLEMENTING RULES ON VISUAL LANGUAGE USING VISUAL BLOCKS

(71) Applicant: Loyalty Juggernaut, Inc, San Jose, CA (US)

(72) Inventors: Kalpak Shah, Palo Alto, CA (US); Azeem Mohammed, Hyderabad (IN); Shyam Shah, San Jose, CA (US); Prasad Gudipalli, Hyderabad (IN)

(73) Assignee: Loyalty Juggernaut, Inc, San Jose, CA (US)

( * ) Notice: Subject to any disclaimer, the term of this patent is extended or adjusted under 35 U.S.C. 154(b) by 0 days.

(21) Appl. No.: 16/866,456

(22) Filed: May 4, 2020

(51) Int. Cl.
G06F 8/34 (2018.01)
G06F 3/0482 (2013.01)
G06F 8/30 (2018.01)

(52) U.S. Cl.
CPC .............. *G06F 8/34* (2013.01); *G06F 3/0482* (2013.01); *G06F 8/316* (2013.01)

(58) Field of Classification Search
None
See application file for complete search history.

(56) References Cited

U.S. PATENT DOCUMENTS

| | | | | |
|---|---|---|---|---|
| 8,352,903 | B1* | 1/2013 | Friedman | G06F 8/30 717/100 |
| 2012/0191446 | A1* | 7/2012 | Binsztok | G06F 8/427 704/9 |
| 2013/0031526 | A1* | 1/2013 | Bernelas | G06F 8/31 717/100 |
| 2013/0185694 | A1* | 7/2013 | Taylor | G06F 9/4494 717/104 |
| 2014/0282586 | A1* | 9/2014 | Shear | G06F 16/285 718/104 |
| 2019/0272157 | A1* | 9/2019 | Stella | G06F 9/45558 |

OTHER PUBLICATIONS

Hall et al., "Infra: Structure All the Way Down—Structured Data as a Visual Programming Language," ACM, 2017, 18pg. (Year: 2017).*
Karaila et al., "Applying Template Meta-Programming Techniques for a Domain-Specific Visual Language—an Industrial Experience Report," IEEE, 2007, 10pg. (Year: 2007).*
Kurihara et al., "A Programming Environment for Visual Block-Based Domain-Specific Languages," ACM, 2015, 9pg. (Year: 2015).*

* cited by examiner

*Primary Examiner* — Ryan D. Coyer

(57) ABSTRACT

A method of implementing rules on visual language using a user selectable visual programming blocks is provided. The method includes providing a visual programming window for receiving a user selection on the visual interface of the user device, wherein the user selection includes a category of visual programming blocks out of a plurality of categories and a selection of a plurality of sub-categories of the visual programming blocks from a plurality of selectable sub-categories of the visual programming blocks, parsing the user selection of (i) the category of visual programming block and (ii) the sub-category of the visual programming blocks, generating a rules program at the rules database comprising the category and the sub-categories of rules from the rules database based on the one or more domain specific language code, wherein the rules program is based on the user selected sequence arrangement of the visual programming blocks at the visual programming window.

16 Claims, 14 Drawing Sheets

METHOD OF IMPLEMENTING RULES ON VISUAL LANGUAGE USING VISUAL BLOCKS

CROSS-REFERENCE TO RELATED APPLICATIONS

This patent application claims priority to Indian provisional patent application serial number 201941017899, filed on May 4, 2019, the complete disclosures of which, in their entireties, are hereby incorporated by reference.

BACKGROUND

Technical Field

The embodiments herein generally relate to executing rules, and more particularly, to a system and method for creating and executing rules using domain-specific visual language.

Description of the Related Art

For a large database, applying rules through visual language is not similar to applying it to a text language. Applying rules to visual programming language need programming environment. Traditional graphical user interface (GUI) development toolkits are inadequate for the creation of visual programming language (VPLs) because they do not support syntactic and semantic specifications of visual programming. The graphical user interface of a visual language relates to the language's syntax and semantics. The interaction (dialogue) between the interface, the syntax, and the semantics must be maintained. Implementing a VPL interface and its support for syntactic and semantic specifications of visual programming suffers from a problem common to all large, complex software systems, i.e., the generation is difficult and time-consuming.

Researchers have developed some high-level tools to ease the implementation of visual languages and visual programming environments. For example, Escalante supports the construction of applications for visual languages that are based on object-relationship abstractions. It provides mechanisms for iterative design, rapid prototyping, and generation of visual language applications within an integrated environment. Currently, DiaGen is a tool for producing diagram editors, which may be used to construct visual programs. These tools may greatly reduce the effort of developing visual languages, although they focus mainly on the construction of user interface aspects of VPLs. SPARGEN is a visual language compiler generator. Its generated parser supports additional action routines written in C++ and, thus, allows complicated actions to be specified in the form of rules. It, however, does not support the generation of a visual programming environment. PROGRES is a strongly typed multiparadigm language with a well-defined context-free syntax, type checking rules, and semantics. The graph rewriting rules in PROGRES provides formalism for graph transformations and are particularly suitable for specifying the semantics of VPLs whose underlying structures are node-edge graphs. PROGRES may generate both programming environments and parsing algorithms. However, it may not use existing programming languages (e.g., C, C++, Java) to specify the actions of its rules directly. Instead, it uses a simple textual language which is a part of the system. This limits the functionality of the target VPLs. Moreover, it has limited visual object construction ability and may only produce syntax-directed editors, which are often difficult to use. PROGRES uses layered graph grammars to specify VPLs. This results in a very complicated parsing algorithm and its performance reaches exponential time.

There remains a need for a method for enabling implementation of rules to enable multiple functions with ease with a supportive visual programming language.

SUMMARY

In view of the foregoing, embodiments herein provide a system and method execute rules using domain-specific visual language with user selectable customized visual programming blocks. The visual programming blocks are embedded and tightly integrated within a visual interface. Consequently, they are often characterized by the attributes of the visual interface. The implementation involves the programming rules engine with a user interface which supports developing programs using a visual language with the help of customized visual programming blocks that may be set in an arrangement by a user to set rules in real time. The system further includes an example of a comprehensive user selectable purpose-built visual programming blocks, each designed and developed to support certain rule function relevant to specific processes, at the same time maintaining flexibility and ease of setting the rules at the user interface level.

In some embodiments, a processor-implemented method for facilitating visual programming by a user via a visual interface of a user device, the method includes the steps of providing a visual programming window for receiving a user selection on the visual interface of the user device, wherein the user selection includes a category of visual programming blocks out of a plurality of categories and a selection of a plurality of sub-categories of the visual programming blocks from a plurality of selectable sub-categories of the visual programming blocks, wherein each of the visual programming block is associated to a template program that translates one or more characteristics of the visual programming block to a domain specific language, receiving the user selection comprising at least one of (i) the category of visual programming block or (ii) a sub-category from among the plurality of selectable sub-categories of the visual programming blocks, wherein each of the plurality of sub-categories is associated with at least one rule from a rules database, parsing the user selection of (i) the category of visual programming block and (ii) the sub-category of the visual programming blocks, wherein the category of visual programming blocks and the sub-category of the visual programming blocks are processed in a user selected sequence arrangement of the visual programming blocks, wherein the user selected sequence arrangement is associated to a sequence template program, recursively executing the template program associated with each of the visual programming blocks to generate one or more domain specific language code, combining the one or more domain specific language code by executing the sequence template program associated with the category of the visual programming blocks, and generating a rules program at the rules database comprising the category and the sub-categories of rules from the rules database based on the one or more domain specific language code, wherein the rules program is based on the user selected sequence arrangement of the visual programming blocks at the visual programming window.

In some embodiments, the visual programming block is enabled to receive at least one of (i) a user input (ii) a user selection from selectable options, wherein the user input or the user selection is transferred to the template program for the sub-category of the visual programming block.

In some embodiments, the user selected sequence arrangement of the visual programming blocks comprises at least one of (a) a category to a sub-category arrangement, (b) a sub-category to a category arrangement, and (c) a sub-category to a sub-category arrangement, of the plurality of the visual programming blocks.

In some embodiments, the user selection at the visual programming window is converted to business rules system using a server side scripting language and is saved at the rules database. In some embodiments the server side scripting language is Java.

In some embodiments, the method includes at least one of (i) receiving at least one action performed on a member data set, (ii) at least one condition set using the visual programming block that applies on at least one member from the member dataset; and automatically executing the rules program, wherein the at least one rule from the rules database is associated to the at least one action performed on the member data set, wherein the member data set comprises a plurality of member user accounts associated with a plurality of member user devices.

In some embodiments, each of the plurality of member user accounts comprises at least one of (1) a predetermined personal information (2) a bank transaction performed on a member user device associated with the visual programming blocks that is selected by the user, and (3) an online action performed at the member user device on one or more of social media platforms. In some embodiments, the examples of transaction include a purchase transaction, flight transaction etc. In some embodiments, the predetermined personal information includes hotel transaction or booking, referral via social media for transaction, referral via the social media for member enrollment, payment with a co-branded credit/debit card, flying business class etc. The online action includes online check-ins in hotels, restaurants and airlines, social media activity that includes liking, upvoting, retweeting etc., promotional activities, and sharing purchase information on social media etc. In some embodiments, the personal information of members is used to determine various conditions for setting rules.

In some embodiments, the at least one action on the member data set comprise one or more of (i) attributing a value to an action performed at each of the plurality of member user accounts based on the at least one rule from the rules database, (ii) attributing a value to a transaction performed at each of the plurality of member user accounts based on the at least one rule from the rules database, (iii) updating the member data set based on at least one of: the action or the attributed transaction value in the plurality of member user accounts, (iv) activating a communication with at least one member user device from among the plurality of the member user devices according to the at least one rule from the rules database, or (v) making a transaction on the at least one member device.

In some embodiments, the at least one rule from the rules database associated with the user selection comprises a category associated with a programming application.

In some embodiments, the visual programming block sets a condition to determine the rule to be present or absent in the rules program for the member dataset.

In some embodiments, the plurality of selectable sub-categories of the visual programming blocks is programmed to automatically mutate based on the user selection of the category of the visual programming blocks.

In some embodiments, the plurality of selectable sub-categories of the visual programming blocks is programmed to automatically mutate based on the user selection of a sub-category from the plurality of selectable sub-categories of the visual programming blocks.

In some embodiments, the visual programming block is programmed to accept at least one input from (i) a numeral value input from the user, (ii) a text input from the user, (iii) a Boolean input, (iv) a vector input, (v) a look-up input, (vi) a date input, or (vii) a limit of validity.

In some embodiments, the user selection of the visual programming block sets a rule and executes at least one action based on the rule in real-time.

In some embodiments, the visual programming block is supplemented with additional visual programming blocks based on an input by the user at the visual programming window.

In some embodiments, a right click on the visual programming block duplicates that visual programming block at the visual programming window.

In some embodiments, the visual programming blocks perform smart mutation.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As stated there remains a need for implementing rules to a visual language enabling multiple functions with ease of operation for an end user without a need of complex programming expertise.

Drools or drl is a business rules management system (BRMS). A rule file is called a drl and the file may have .drl extension. In some embodiments, the business rules management system (BRMS) is Drools for implementing rules set in real time using a visual programming interface.

Visual programming blocks or visual blocks are defined as a demarcated shape that are embedded and capable of being associated with one or more demarcated shapes in user selectable sequential arrangement.

Mutation of visual programming block is defined as change in one or more of physical form, attributes, value, sub-category of the visual programming block.

Figure 1:
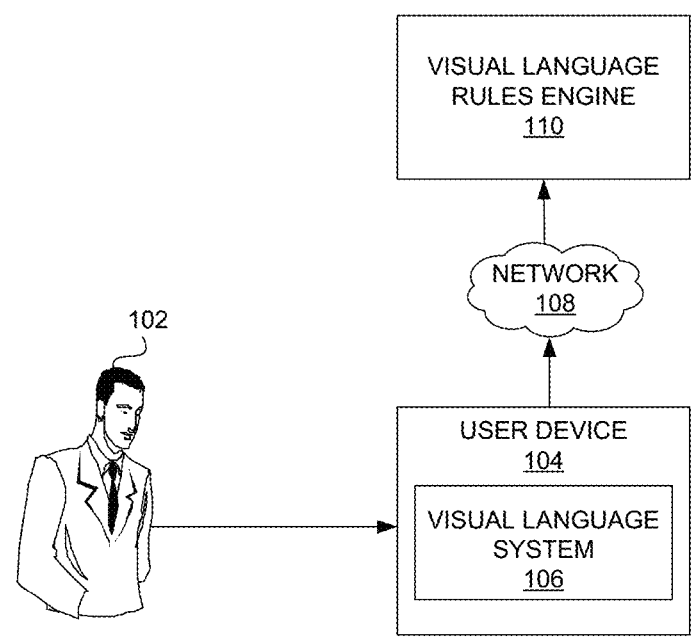
FIG. 1 is a system view of a visual language system to set up rules with visual language rules engine according to an embodiment herein.

FIG. 1 is a system view of a visual language system 106 to set up rules with a visual language rules engine 110 according to an embodiment herein. The system includes a user device 104 that includes a visual language system 106 that communicates to a visual language rules engine 110 with a network 108. In an embodiment, the network 108 is wireless. In some embodiments, the network 108 is wired communication. The user device 104 may be but not limited to, a tablet, a laptop, a computer device, a customized input device, or a mobile phone. In an embodiment, a user 102 may interacts with the user device 104. The visual language rules engine 110 may be a on a server or a cloud. The visual language rules engine 110 provides a visual programming window for generating a rules program, on the user device 104 using the visual language system 106. The visual language rules engine 110 (i) executes the rules program as an action, (ii) updates attributes and member attributes in the rules database 112 and (iii) communicates an output to the visual language system 106 that displays the rules selection on the visual programming window of a user interface with interactive sequence selectable visual programming blocks arrangement.

In a drl file, the user may have multiple rules, queries, and functions, as well as some resource declarations like imports, globals and attributes that are assigned and used by rules and queries set by the user. User may spread rules across multiple rule files associated to the plurality of visual programming blocks. Spreading rules across files may help with managing large numbers of rules. The overall structure of a rule file is a package that includes import statements, globals, functions, queries and rules. It has corresponding package names. The order in which the elements are declared is not important, except for the package name that, if declared, may be the first element in the rules file. A category of a visual programming block out of a plurality of visual programming blocks may be associated to the package. In an embodiment, selection of sub categories of visual programming blocks is optional.

In some embodiments, a package is a collection of rules and related constructs like imports and globals. The package members are typically related to each other. A package represents a namespace, which ideally is kept unique for a given grouping of rules. The package name itself is the name space, and is not related to files or folders in any way. Import statements work like import statements in Java. User may specify the fully qualified paths and type names for any objects user wants to use in the rules. With global user defines global variables. They are used to make application objects available to the rules. Typically, they are used to provide data or services that the rules use, especially application services used in rule consequences, and to return data from the rules, like logs or values added in rule consequences, or for the rules to interact with the application, doing callbacks. Functions are a way to put semantic code in a rule source file, as opposed to in normal Java classes. They may not do anything more than what is done with helper classes. In fact, in an embodiment, the compiler generates the helper class behind the scenes. The advantage of using functions in a rule is that user may keep the logic all in one place, and user may change the functions as needed. Functions are most useful for invoking actions on the consequence-'then' part of a rule, especially if that particular action is repeated, with differing parameters for each rule. In an embodiment, an equation block allows the user to write a mathematical equation or formula involving one or more entity variables and static values, by connecting to one or more attribute blocks and/or one or more member attribute blocks and static value blocks. The equation block is used as a part of a condition block or an action block executed on rule block.

In an embodiment, a visual programming language block is designed to automatically mutate based on the condition block or an action block being implemented by the user. For example, the mutation of a condition block if the user selects attribute-an object, mutation prompting user to choose an attribute from a pre-configured list of attributes or if the user selects member and then the object, block mutates prompting user to choose level of the member attribute (program, context, first user selectable or programmable input defining level) to show appropriate list of member attributes based on the level chosen. Based on the datatype of the attribute selected by the user, the block mutates to present the user either with an appropriate type of operator or prompt the user to select specific level or the aspect of the attribute that the user intends to use in the condition. For the attribute chosen, block mutates for the user to select the relevant variable—such as static value, equation or list of value.

In an embodiment, the visual programming blocks may be duplicated by right-clicking on the block. Duplicating the blocks may allow exporting and importing the rule definition seamlessly.

Figure 2:
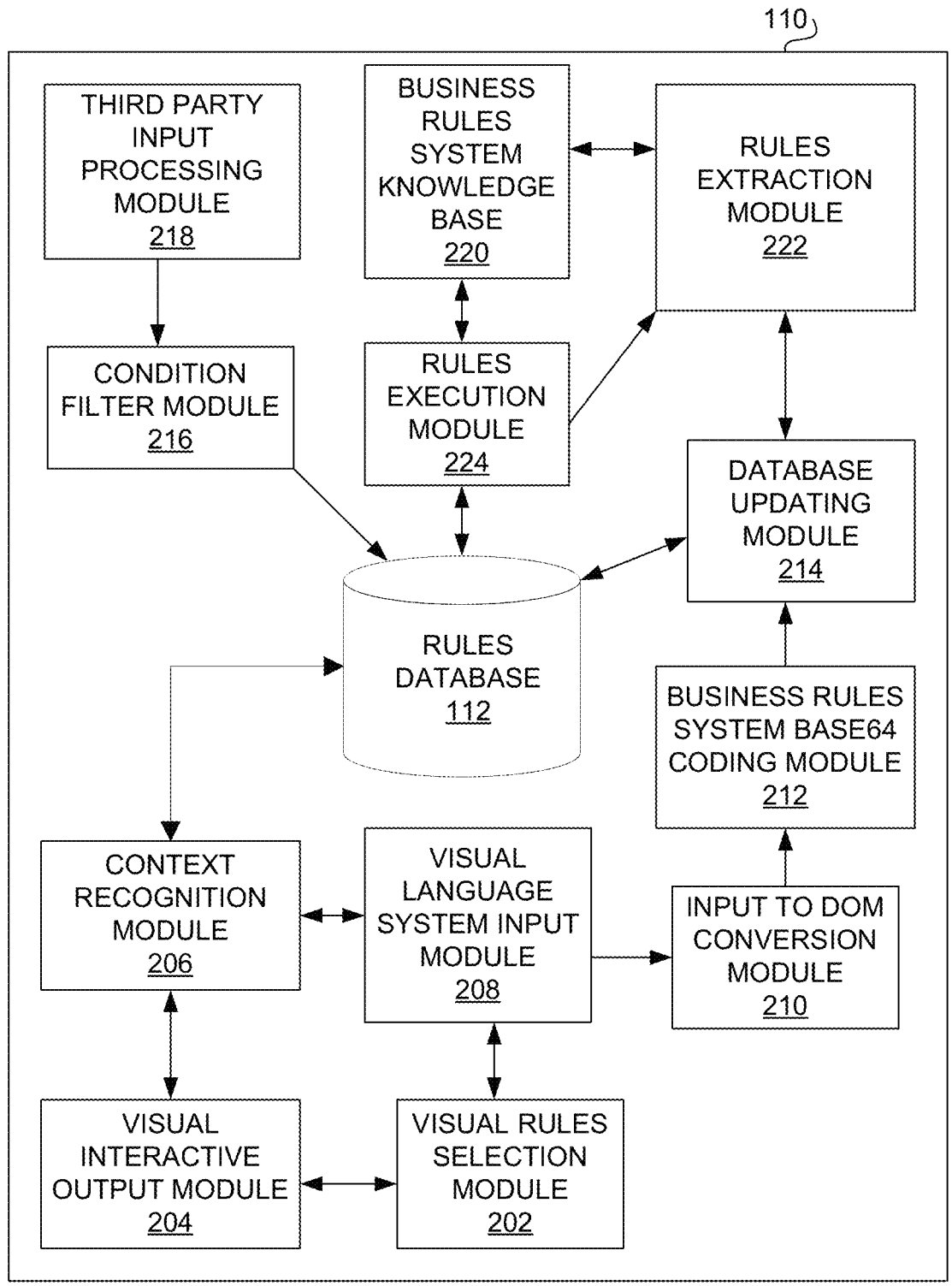
FIG. 2 illustrates an exploded view of the visual language rules engine of FIG. 1 according to an embodiment herein.

FIG. 2 illustrates an exploded view of the visual language rules engine 110 of FIG. 1 according to an embodiment herein. The visual language rules engine 110 includes the rules database 112, a visual rules selection module 202, a visual interactive output module 204, a context recognition module 206, a visual language system input module 208, an input to DOM conversion module 210, a business rules system base64 coding module 212, a database updating module 214, a condition filter module 216, a third party input processing module 218, a business rules system knowledge base 220, a rules extraction module 222 and a rules execution module 224. The visual rules selection module 202 enables the user input at the user interface for a user selected sub category of visual programming blocks. The visual interactive output module 204 generates previously executed visual programming block on the user interface. The context recognition module 206 places the selected sub category visual programming block in relation with the previously selected category or sub category of visual programming blocks and provides predetermined visual programming block predictions for the next selection by the user according to the category or sub category of the visual programming block selected and communicates the visual programming block with the context to the business rules system knowledge base 220. The visual language system input module 208 saves the user input as a rule in the business rules system knowledge base 220. The input received at visual language system input module 208 is converted to DOM (document object model) at the input to the DOM conversion module 210 and further processed at the business rules system base64 coding module 212. The database updating module 214 updates the rules database 112 and the business rules system knowledge base 220 on execution of any rules. The condition filter module 216 determines a rule to be executed from the business rules system knowledge base 220 based on the member inputs.

The condition filter module 216 also updates the rules database 112 with the input of predetermined transactions or member or customer activity. The third party input processing module 218 interacts with third-party inputs of predetermined transactions or predetermined user activity. The business rules system knowledge base 220 stores the user inputs. The Rules extraction module 222 is activated when the condition filter module 216 determines a rule to be executed from the business rules system knowledge base 220. The rules execution module 224 executes the rules which are communicated to visual interactive output module 204, which is further communicated to a context recognition module 206 and connected to the visual language system input module 208 and visual rules selection module 202. The visual rules selection module 202 reacts to the input and selects a further visual interactive block from the rules database 112 based on the context at the context recognition module 206.

In an embodiment, the first rule is set using a category which determines sub-categories of visual programming blocks for generating a rules program related to a particular application. For example, counting member value based on purchase value or transaction, influence and ease of business parameters for a plurality of airline members and selecting offers based on each of these parameters for each of the plurality of the members.

Each parameter is weighed differently according to predetermined numbers as calculated in relation to the application.

In an embodiment, setting up the category allows the user the logic to select the subsequent sub categories defining rules by either selecting from the options suggested or entering a new rule using a visual programming block.

Figure 3:
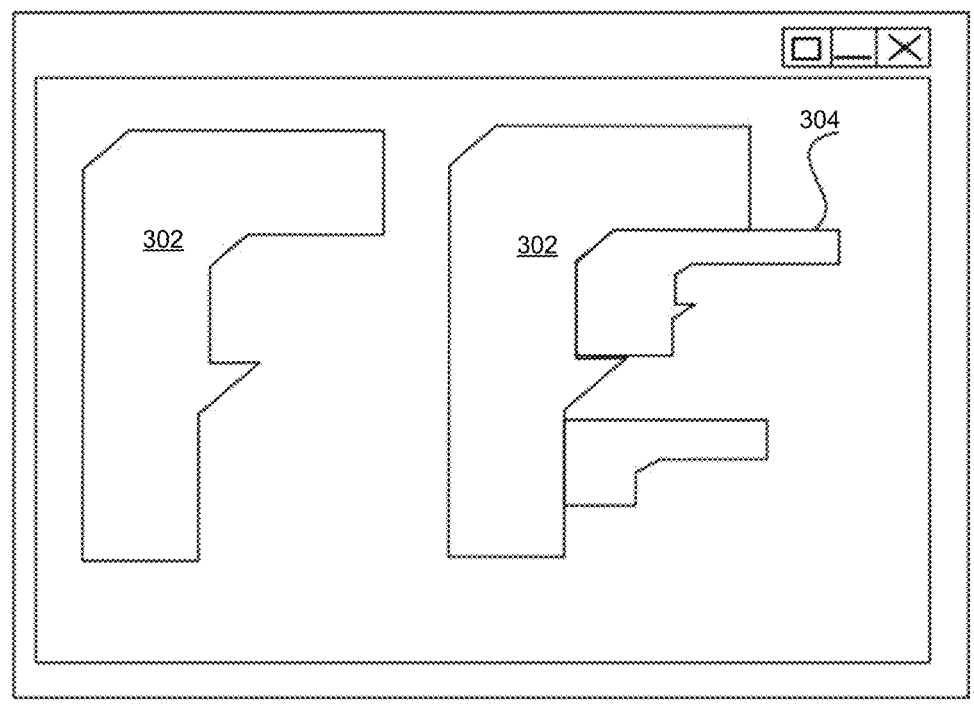
FIG. 3 illustrates a user selection of a category of a visual programming block along with selectable sub-categories at a visual programming window according to an embodiment herein.

FIG. 3 illustrates a user selection of a category of a visual programming block along with selectable sub-categories at a visual programming window of visual language system 106 of FIG. 1 according to an embodiment herein. The category defining visual programming block 302 is the first visual programming block selected to define the context for the rules being set according to the application. For example, airline member management.

The user may choose the plurality of the sub categories of the visual programming blocks as per their requirement. There are multiple sub-categories of the visual programming blocks. Few examples are given in the table below.

| Sub category | Function | Customized to | Connected to from a first side | Connected to from a second side |
| --- | --- | --- | --- | --- |
| Activity block | Define an activity | Allow selection filter of the activity | Category defining visual programming block 302 | Action block or condition block |
| Event block | Define an event | Allows defining of an event | Category defining visual programming block 302 | Action block, rule block or line rule block |
| Filter block | If- then for unless- then situation filter | Filter rules | a rule block | Action block, condition block, equation block, static value block, text rule block |
| Action block | Determining action for executing rules | Determine rules | A Condition block | Equation block, Member Attribute block, Activity Attribute block |

-continued

| Sub category | Function | Customized to | Connected to from a first side | Connected to from a second side |
|---|---|---|---|---|
| Member Action | Determining action on member for executing rules | Determine rules | Condition blocks | Equation block, Member Attribute block, Activity Attribute block |
| Equation block | a mathematical equation or formula involving one or more entity variables and static values | Receive variable input and static values | Condition block or action block | Attribute block (member and activity) attribute block or static value block |
| Date Operation Block | a mathematical formula involving one or more entity variables of date types and static values | Receive variable input of date types and static values | Condition block or action block | Attribute block or member attribute block or static value block |
| Attribute block | to select specific level or the aspect of the attribute or suggest appropriate operator based on user selection | Reads the values of member, BIT, or Product data | Condition block or action block | |
| Conversion block | To provide the conversions for various entities like the currency, reward rate, award rate | Reads the value of Currency conversion, awards rate, reward rate, and Sponsor base rate from the program setup | Condition block or action block | |
| rule condition block | To allow setting up conditions to qualify the rule | Adopt various level of data like member attribute at offer/activity/program level, member data, attribute data type, etc. | Rule block | Action block, condition block, equation block, data equation block, conversion block, static value block, text value |
| rules block | To allow setting up rules which is built using conditions and actions | Provide nesting for rules | Rule block | Condition or action block |
| Line rule block | To allow setting up rules which is built using conditions and actions on line items (purchased SKUs) level | Allows iterating over line items (purchased SKUs) | Activity Block or Rule block | Condition or action block |

In an embodiment, the category defining visual programming block 302 is visually arranged into a configuration of category-sub category arrangement to set subsequent rules with different visual programming blocks. The visual programming blocks that may be attached to the category defining visual programming block are an activity block 304 and an event block as sub category of the visual programming blocks. The category defining visual programming block 302 may include any number of sub category of the visual programming blocks.

In some embodiments, the sub-categories of the visual programming block include a vector counter visual programming block. The vector counter visual programming block includes a vector counter. In some embodiments, the vector counter allows tracking a specific behavior of a member across one or more situations that can be distinct. The one or more situations may be distinct, and the behavior of the member may be different across the one or more situations. In an exemplary embodiment, the one or more situations may include the behavior of the member at a first retail store, and the behavior of the member at a second retail store.

A counter is described as a member attribute that tracks a particular behavior of the member. In an exemplary embodiment, member counters may include tracking one or more visits of the member in a particular store, tracking spend of the member in a particular enterprise, a number of flights taken by the member. Traditionally, a scalar counter is used and a name of the counter and a value to set in that counter is required. A scalar counter stores a single value in it. If the behavior of the member behavior is required to be tracked in N variations of situations, then 'N' number of counters are required which requires the user to specify a rule 'N' times to operate 'N' counters.

The vector counter allows passing of a context as an additional input to read the value of the counter. To update the vector counter, a name of the vector counter, a situation/index, and the value to set in the situation/index in the counter may be required. In an exemplary embodiment, the vector counter may store 100 values. A single statement can read the value of the counter using the counter name and provide a location ID from where a transaction has been obtained. Hence, a single rule allows the user to store the one or more counts. To implement a rule using the vector counter, the vector counter may be defined as "visit count", and whenever the member does any transaction in at least one location, the vector counter by the name "visit count" is incremented by passing the location ID. Thus "visit count" vector counter keeps track of visit count of a member by location, wherein there can be 100s of locations. e.g. 3 visits to Starbucks @ WTC, 5 visits at Starbucks @ Times Square.

In some embodiments, the vector counter provides faster computational processing and occupies less database storage compared to the scalar counters. The vector counter comprising 'n' values may be processed much faster compared to processing 'n' scalar counters, due to the fact that machines have an ability to process vector operations in parallel and there is a speed-up of O(n) when compared to scalar counters.

Figure 4:
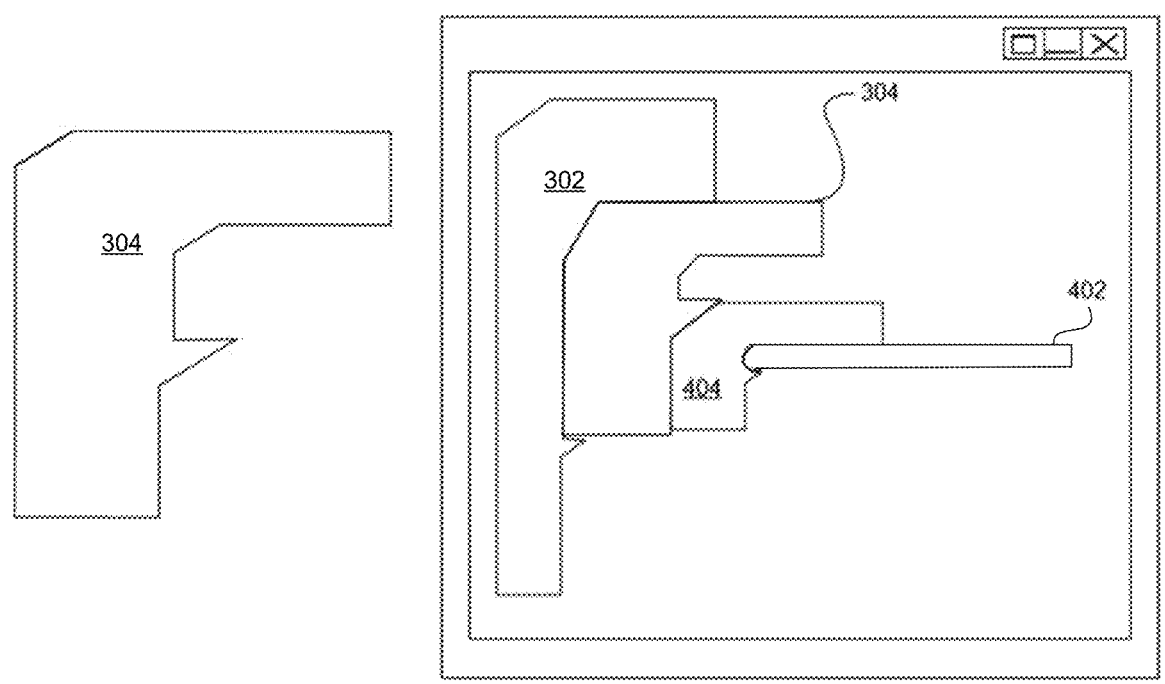
FIG. 4 illustrates a user selection of an exemplary sub-category to a sub-category arrangement of a visual programming block of visual language system of FIG. 1 according to an embodiment herein.

FIG. 4 illustrates a user selection of an exemplary sub-category to a sub-category arrangement of a visual programming block 302 at the visual language system 106 of FIG. 1 according to an embodiment herein. The inputs are reported to and stored in the rules database 112 pertaining to the activity block 304 from one or more from the channels including web, mobile, kiosks, point of sale, ATM machines. The activity block 304 is executed on in category-sub category arrangement, with a category defining visual programming block 302. The activity block 304 is executed on by a rule block (RCA) 404 which is further defined by a condition filter block 402.

In an embodiment, the condition filter block 402 decides whether an input reported to and stored at the database, pertaining at the activity block 304 may be qualified to execute the rules at the visual language rules engine 110. For example, only activities defined by a transaction as 'dining' are qualified to trigger an output of a predetermined 'offer'. In some embodiments, a plurality of the activity block 304 are executed on the category defining visual programming block 302.

In an embodiment, a rule block 404 includes one or more conditions and one or more actions. If all the set conditions are satisfied, then all the actions are executed. The rule block 404 may be tagged by the user with a name of their choice. The rule block 404 may be header level or line level based on the level they operate. For example, a rule block 404 may be used to set up a rule with a user-defined name 'senior citizen special reward' with a condition block to check if the age of the member is more than 60 years, then an action block 'reward points' in '100' quantity is executed. Also, the executed action is stored in the database and a member attribute that in this case is 100 reward points is updated accordingly at the database. In some embodiments, a plurality of the rule block 404 is executed on the category defining visual programming block 302.

Figure 5:
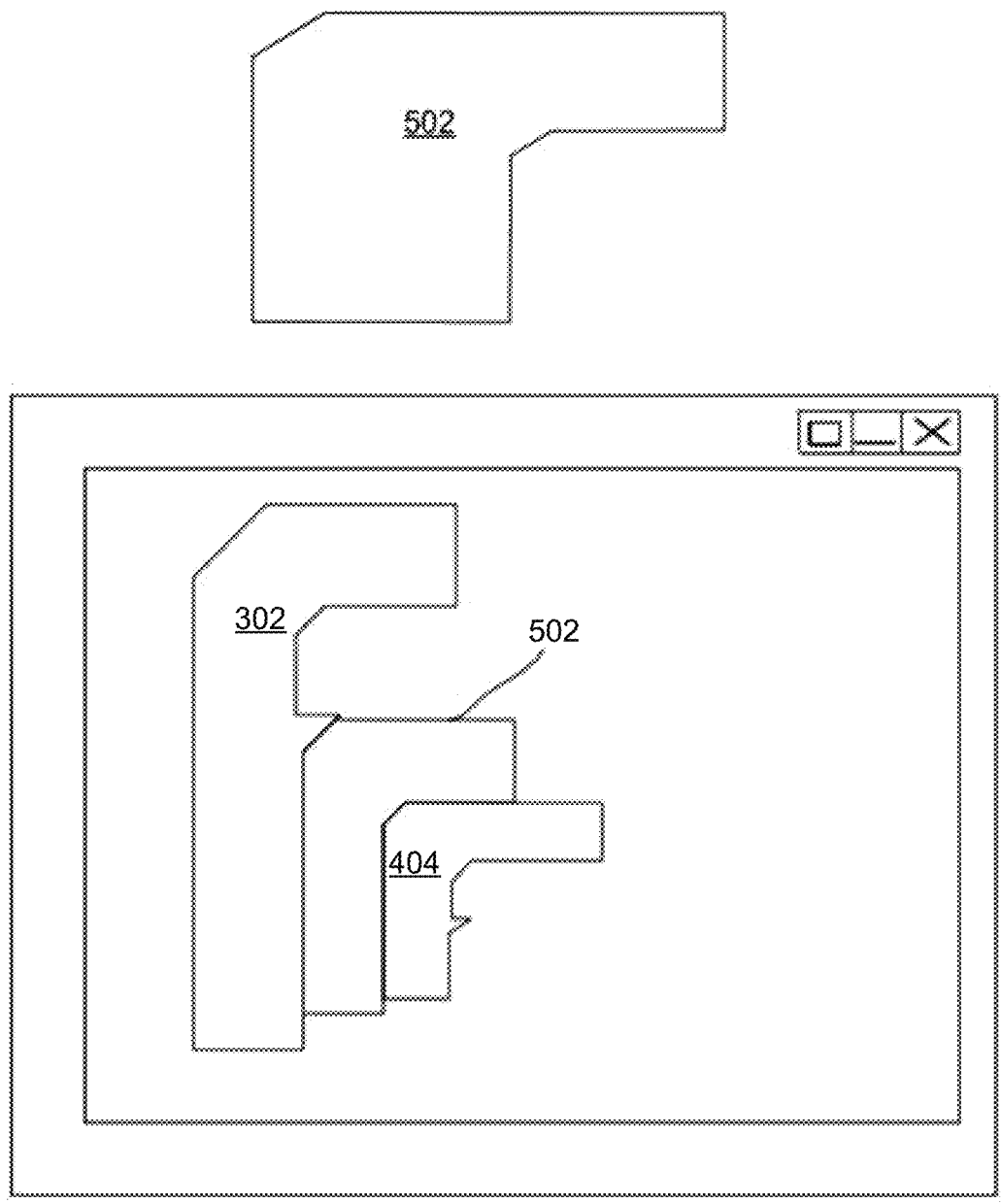
FIG. 5 illustrates a user selection of an exemplary category to a sub-category arrangement of a visual programming block at the visual language system of FIG. 1 according to an embodiment herein.

FIG. 5 illustrates a user selection of an exemplary category to a sub-category arrangement of a visual programming block at the of visual language system 106 of FIG. 1 according to an embodiment herein. The event block may be attached to the category defining visual programming block 302 selected by the user in a sub category-category arrangement. The event block may be further attached to a rule block 404 in the category-sub category arrangement. The event block may have any number of rule blocks 404. In an embodiment, an event block 502 includes one or more rule blocks 404 that are executed one time or on a recurring basis, based on the user-defined conditions. For example, the user may set '3 pm daily' as a rule using a visual programming block library. The rule blocks 404 may be defined by one or more condition filter blocks 402.

Figure 6:
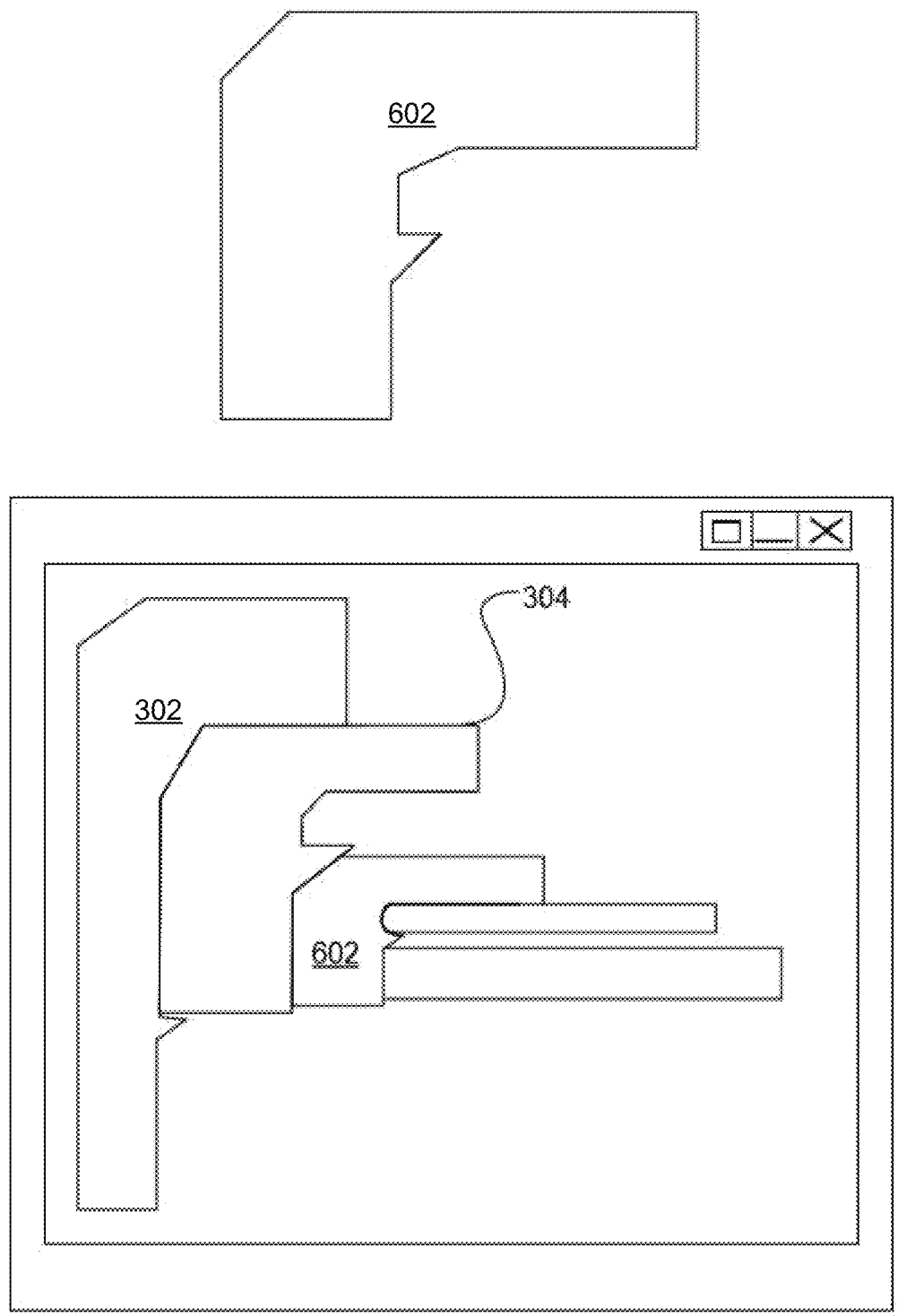
FIG. 6 illustrates an exemplary sub-category arrangement of a visual programming block defining a text rule at the visual language system of FIG. 1 according to an embodiment herein.

FIG. 6 illustrates an exemplary sub-category arrangement of a visual programming block 302 defining a text rule at the visual language system 106 of FIG. 1 according to an embodiment herein. The line rule block 602 may be attached to an activity block 304 in the category-sub category arrangement. In an embodiment, the line condition action block 602 is further attached in a category-sub category arrangement by a condition block and an action block. Line rule allows selection of a single rule out of multiple options provided or entered at the user level. For example, the line rule block 602 may include a condition block to check if the item consumed by a restaurant member included a "cheesecake" and an action block that rewards 100 points if member's order includes a 'cheesecake'.

Figure 7:
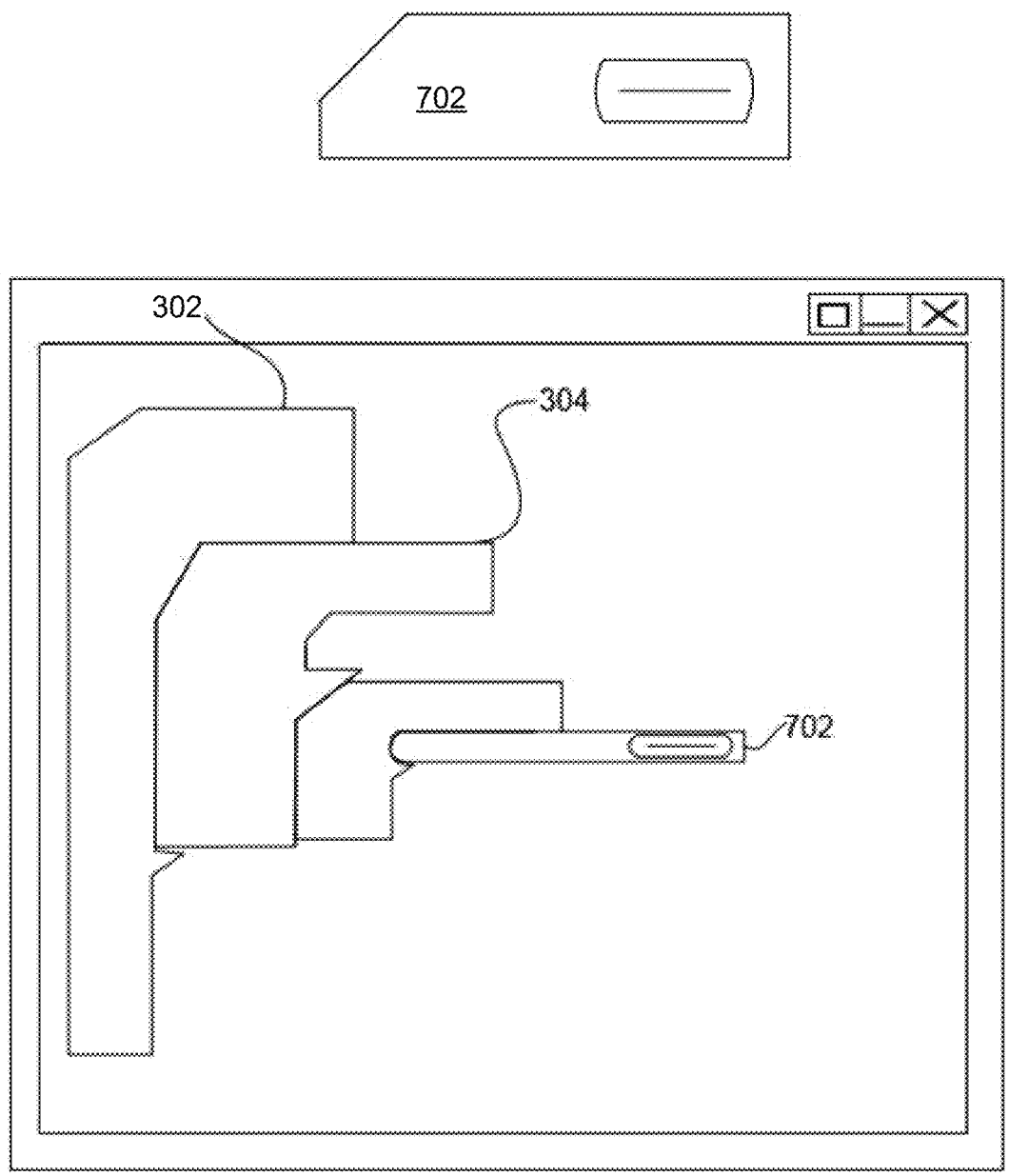
FIG. 7 illustrates an exemplary sub-category arrangement of a visual programming block defining a condition blocks at the visual language system of FIG. 1 according to an embodiment herein.

FIG. 7 illustrates an exemplary sub-category arrangement of a visual programming block defining a condition at the visual language system 106 of FIG. 1 according to an embodiment herein. The condition block 702 is attached to a line rule block 602 in the category-sub category arrangement. The line rule block 602 is executed on to the activity block 304 and the activity block 304 is in turn executed on to a category defining visual programming block 302 in the category-sub category arrangement. The condition block 702 offers selection options. The user 102 may select aspects, product, function, static value, etc. that defines user input.

In an embodiment, the condition block 702 defines a qualification expression. It may include an input which is selected from an object, an attribute, an operator or a value. A value may be static or calculated. Based on the attribute type, the condition block mutates programmatically to prompt the user to provide suitable inputs. For example, if object chosen by the user 102 is 'member', then the condition block displays the attribute level, that is drop down menu of program level, offer level and activity level, and upon selecting the attribute level, the condition block may further display a list of relevant attributes to select from.

Figure 8:
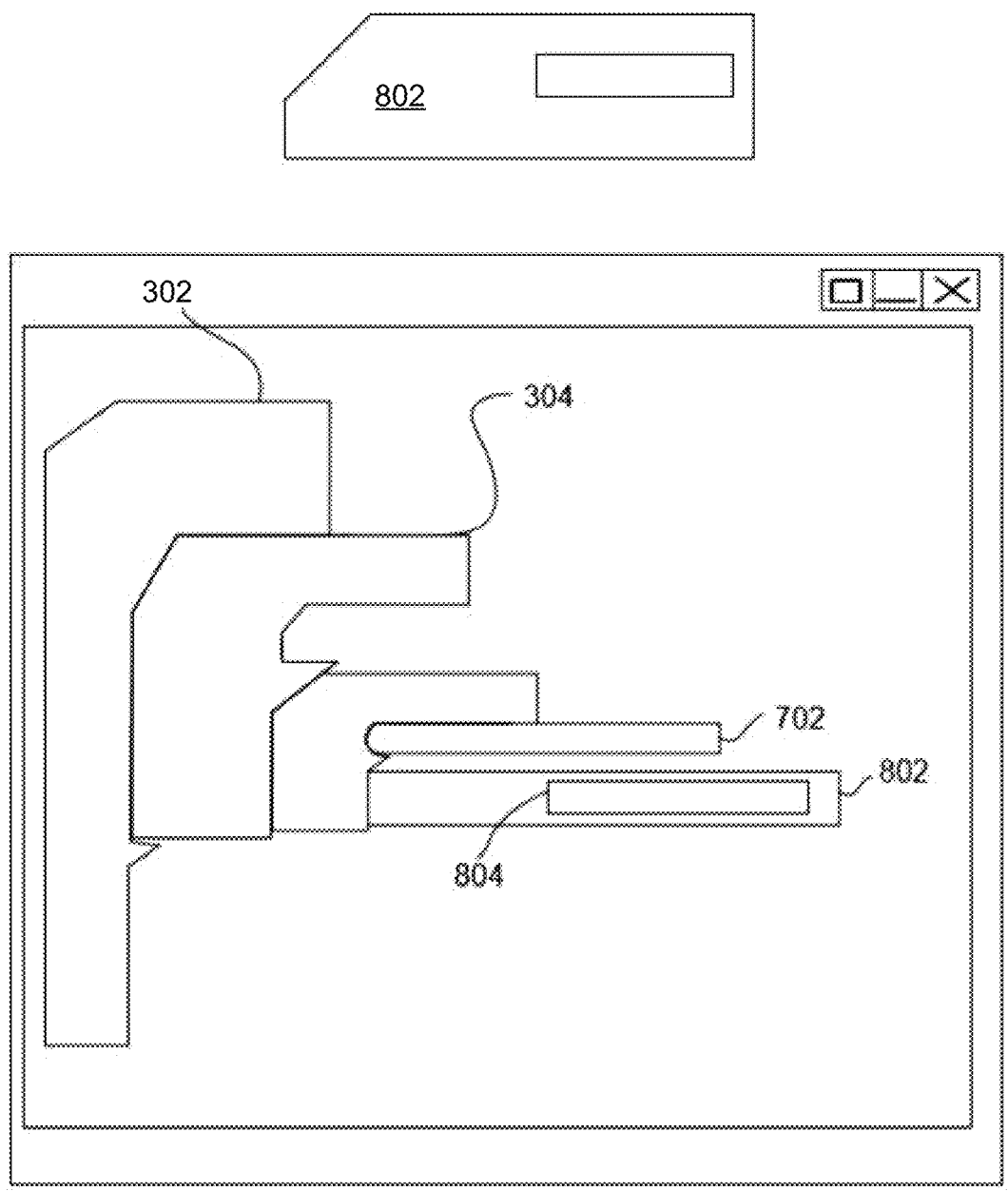
FIG. 8 illustrates an exemplary sub-category arrangement of a visual programming block defining an action along with a static value rule blocks at the visual language system of FIG. 1 according to an embodiment herein.

FIG. 8 illustrates an exemplary sub-category arrangement of a visual programming blocks at the visual language system 106 of FIG. 1 defining an action along with a static value rule according to an embodiment herein. An action block 802 is attached to a line rule block 602 in the category-sub category arrangement. The line rule block 602 may be further attached to the activity block 304 and the activity block 304 may be in turn attached to a category defining visual programming block 302 in category-sub category arrangement. The action block 802 may update an attribute or add variables. A static value block 804 is where a static value may be entered by the user. It allows the user to enter free text or number depending on the category of a condition block 702 or an action block 802.

In an embodiment, static value-date allows the user to select a specific date as a part of a condition block or an action block to be implemented. In an embodiment, an action block 802 specifies the actions to be executed. If all the conditions blocks 702 on the rule block are satisfied, all the action blocks 802 are executed. An example of an action block for a specific action could be select-'update attribute' at select-"program level' that, select-'membership stage' is, select-'active'. In an embodiment, there is also a member action block. The third-party action block implements action on a member related to the business of the user 102. The third-party action is processed through the third party input processing module 208.

Figure 9:
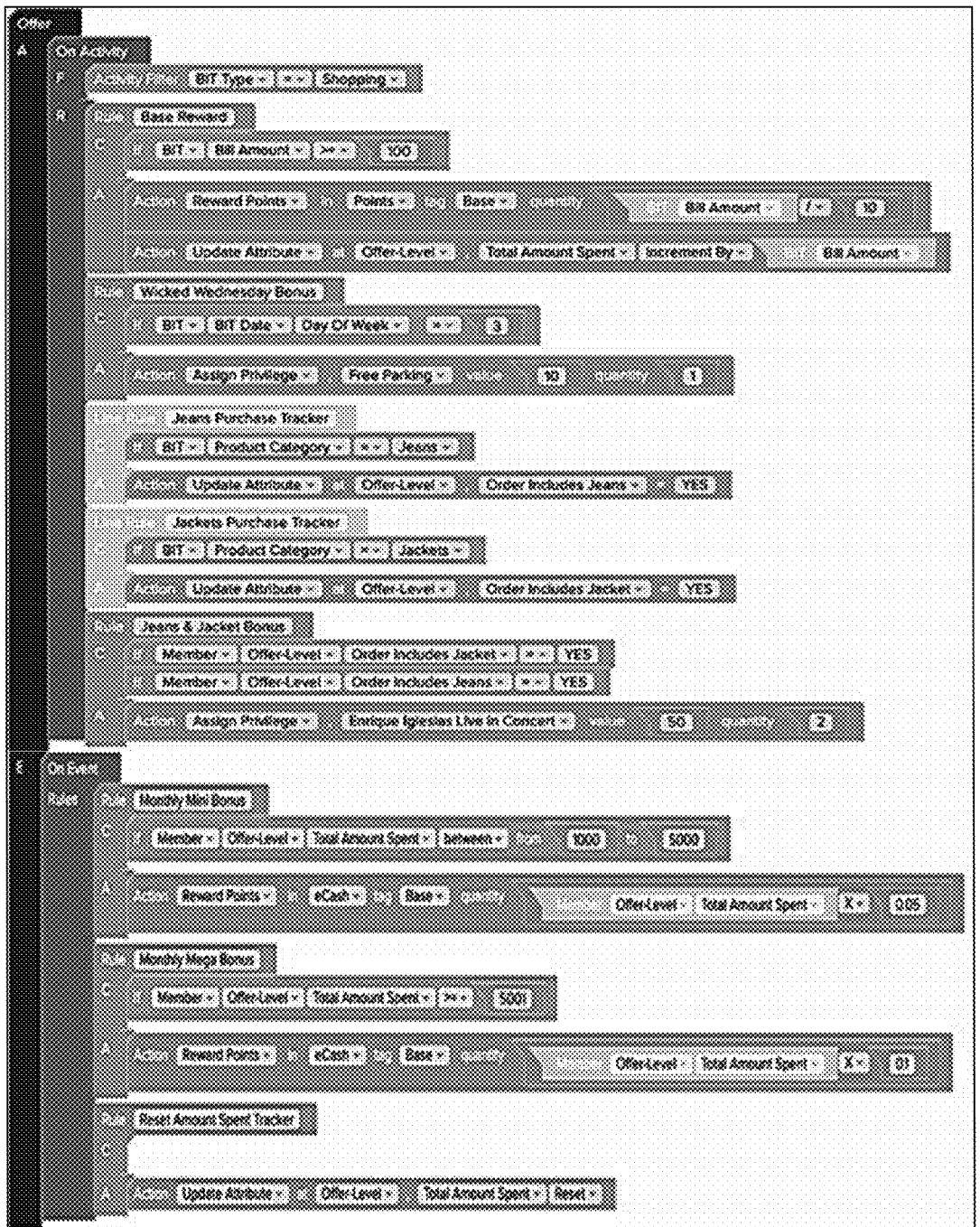
FIG. 9 illustrates an exemplary user selected sequence arrangement of the plurality of visual programming blocks at the visual language system of FIG. 1 according to an embodiment herein.

FIG. 9 illustrates an exemplary user selected sequence arrangement 902 of the plurality of visual programming blocks at the visual language system 106 of FIG. 1 according to an embodiment herein. A category defining visual programming block 302 is defined to be an offer. The offer executes on the activity block 304 that includes an activity and the event block 502 that includes an event. The condition filter block 402 defines the activity of a member. At the activity block 304 'activity' business, influence and transaction (BIT) value of the member is generated along with the amount spent on the user interface at the condition filter block 402. The rule blocks 404 are defined for 'base reward' and 'happy hour bonus' further defining conditions using condition blocks 702 based on amount and date and time of the day and generating rewards using action block 802. At the event block 502 'event', The rule block 404 is set for monthly auto redemption on which action block is executed to assign privilege or cash coupon with a value and quantity static blocks.

In an embodiment, there are category defining visual programming blocks 302 defining activity blocks 304, that defining, a set of condition filter blocks 402 and, rule blocks 404, rule blocks 404 further defining condition blocks 702 and action blocks 802. Category defining visual programming blocks 302 further define event blocks 502, which define another set of condition filter blocks 402 and, rule blocks 404, rule blocks 404 further defining condition blocks 702 and action blocks 802.

In an embodiment, an offer execution includes the steps of, qualifying actions based on one or more user-defined filters evaluating of one or more user-defined rules, which in turn include one or more user-defined conditions, which if satisfied result into one or more user-defined actions, setting using determined visual programming blocks as shown in an example of a visual programming block arrangement.

In an embodiment, a condition block 702 may be further categorized into an entity variable condition or a static value condition or an equation condition. In an embodiment, the entity variable condition block 702 may have variable transaction information and variable other attributes assigned to it. In an embodiment, an action block 802 may be categorized into an entity variable action or a static value action or an equation action. The entity variable action block 802 may have variable transaction information and variable other attributes assigned to it. In an embodiment, the condition block 702 defines a qualification expression. It may include an input which is selected from an object, an attribute, an operator or a value. A value may be static or calculated. In some embodiments, based on the attribute type, the condition block 702 may mutate programmatically to suggest user 102 suitable inputs.

In an embodiment, a member attributes block provides a list of all user configured attributes that describe the member on activity block 304. It is used mainly for evaluating conditions blocks 702 and/or determining action blocks 802. Member attributes blocks are tracked at the program level, at the category defining visual programming block 302 and at the activity block 304 level. For example, Description of Rules: Activity Filter: The Activity filter is set to filter only 'Shopping' transactions.

In an example, rule one is 'base reward rule' evaluates a condition if the total Bill Amount is $100 or above and if the condition is satisfied, then it triggers two actions as follows (i) rewards points to the member equivalent to 1 point per $10 spent.

The rule 3, 4 and 5 may work together.

Rule three 'jeans purchase tracker' checks if the member's shopping basket includes a pair of Jeans i.e. the condition, and if the condition is satisfied, then the it flags a dynamically defined attribute at the activity level by the user 'order Includes jeans' as yes i.e. the action is determined.

Rule four 'jacket purchase tracker' checks if the member's shopping basket includes a Jacket i.e. condition, and if such condition is satisfied, then the it flags a dynamically defined attribute at the activity-level by the user 'order includes jacket' as yes i.e. the action is determined.

Rule five rule 'jeans & jacket bonus' checks the outcome of the above two rules by checking the values of the two dynamically defined attributes at the activity-level by the user 'order contains Jeans' and 'order contains Jacket' i.e. two conditions, and if the value set for both these attributes is 'yes' by the rules above, then it assigns two 'Enrique Iglesias live concert' passes, worth $50. The rules 3,4, 5 are included inside the 'on activity' visual programming block. Thus, it is evaluated in real-time 'on-activity' as soon as the shopping activity is completed by the member, updates the a dynamically defined attribute by the user at the offer-Level 'total Amount Spent' by the member across all the orders during the offer period in a user-defined attribute.

For example, this rule is included inside the 'on activity' block. Thus, it is evaluated in real-time 'on-activity' as soon as the shopping activity is completed by the member. Rule two may be 'wicked Wednesday bonus' evaluates a condition if the shopping was done on Wednesday and if this condition is satisfied, the it assigns a 'Free Parking Pass' to the member of $10 value with an user selected action block.

This rule is included inside the 'on activity' visual programming block. Thus, it is evaluated in real-time 'on-activity' as soon as the shopping activity is completed by the member. In an example, Rule 6, 7 and 8 work together. These rules are included inside 'on event' visual programming block, which means these rules are evaluated only on occurrence of a user-defined event such as, at 12:00 AM of $1^{st}$ Day of every month throughout the offer period.

In an example, rule six may be 'monthly mini bonus' may check the total spend by the member at the end of every month as updated by the rule one in the dynamically defined attribute by the user at the offer level 'total amount spent' and if it is between $1,000 to $5,000 i.e. condition, it rewards 5% of the spend as the cashback in the form of e-cash i.e. action.

In an example rule seven may be 'monthly mega bonus' checks the total spend by the member at the end of every month as updated by the Rule one in the dynamically defined attribute by the user at the offer level 'total amount spent' and if it is above $5,000 i.e. condition, it rewards 10% of the spend as the cashback in the form of e-cash i.e. action. Rule eight may be 'reset amount spent' tracker resets the value of the dynamically defined attribute by the user at the offer level 'total amount spent' i.e. action. So that it starts accumulating members' spend for the new month from zero again. This rule doesn't require any condition. Here is an algorithm that illustrates the operation.

```
Activity-1
    filter:
        bit.h_bit_type == "PURCHASE" // filter criteria
    rules:
    rule("Base Reward"):
        condition:
            bitHeader.bill_amount >= 100 // rule condition
        action:
            reward(tag="BASE", account_id = "1", value =
header.bill_amount/10)
            updateCounter(level="offer", name="Total Amount Spent",
value = header.bill_amount, type="add")
    rule("Wicked Wednesday Bonus"):
        condition:
            readAttributeD("h_bit_date", "DAY_OF_WEEK") == 3
        action:
            assignPrivilege(product="9914", value=10, quantity=1)
    rule("Jeans Purchase Tracker"):
        condition:
            bitLine.1_product_category == "Jeans"
        action:
            updateCounter(level="offer", name="Order Includes Jeans",
value = "Yes", type="set")
    rule("Jackets Purchase Tracker"):
        condition:
            bitLine.l_product_category == "Jackets"
        action:
            updateCounter(level="offer", name="Order Includes Jacket",
value = "Yes", type="set")
    rule("Jeans & Jacket Bonus"):
        condition:
            counter("Order Includes Jacket") == "YES" and counter("Order
Includes Jeans") == "YES"
        action:
            assignPrivilege(product="9913", value=50, quantity=2)
    end rules
end Activity-1
Event-1
    rules:
    rule("Monthly Mini Bonus"):
        condition:
            counter(type="offer",name="Total Amount Spent") is
between(1000,5000)
        action:
            reward(tag="BASE", account_id = "1", value =
counter(type="offer",name="Total Amount Spent") * 0.05)
    rule("Monthly Mega Bonus"):
        condition:
            counter(type="offer",name="Total Amount Spent") >= 5001
        action:
            reward(tag="BASE", account_id ="1", value =
counter(type="offer",name="Total Amount Spent") * 0.01)
    end rules
end Event-1
```

Figure 10:
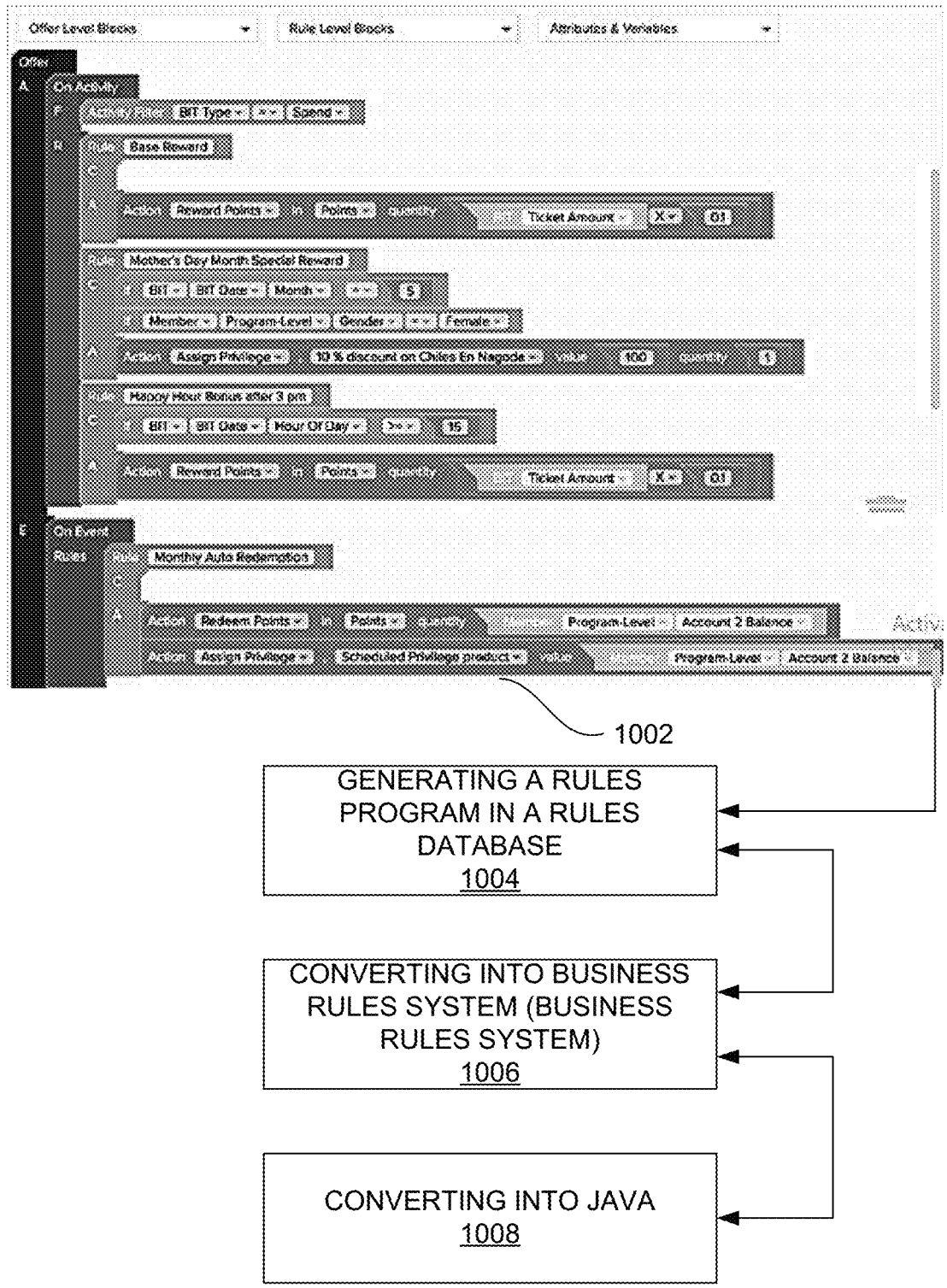
FIG. 10 illustrates a flowchart of conversion of user selected sequence arrangement of the plurality of visual programming blocks at the visual language system of FIG. 1 according to an embodiment herein.

FIG. 10 illustrates a flowchart of conversion of user selected sequence arrangement of the plurality of visual programming blocks at the visual language system 106 of FIG. 1 according to an embodiment herein. A flow chart explaining the conversion of rules set with a visual language blocks converting to an intermediate language drl, converting into Base64, storing it into the fast SSD based rules database 112 and fetching of the data of the rules from the rules database 112 when a transaction is ingested into the system. At step 1002, using a category and sub categories of the visual programming blocks as per the user selection from multiple predetermined or customizable categories and sub-categories of the visual programming blocks available. At step 1004, generating a rules program in a rules database 112 and converting into an intermediate language for knowledge representation and reasoning (KRR) called Business rules system (drl) at step 1006. At step 1008, converting the drl into Base64 and storing it into the rules database 112 for execution purpose. The rules database 112 may be fast SSD based. When a transaction is ingested into the system from a member data set, this drl would be fetching from the rules database 112 to apply the rules program. The rule execution module 224 evaluates rules based on the filter, condition, and actions as defined by the user selection of the visual programming blocks.

Figure 11:
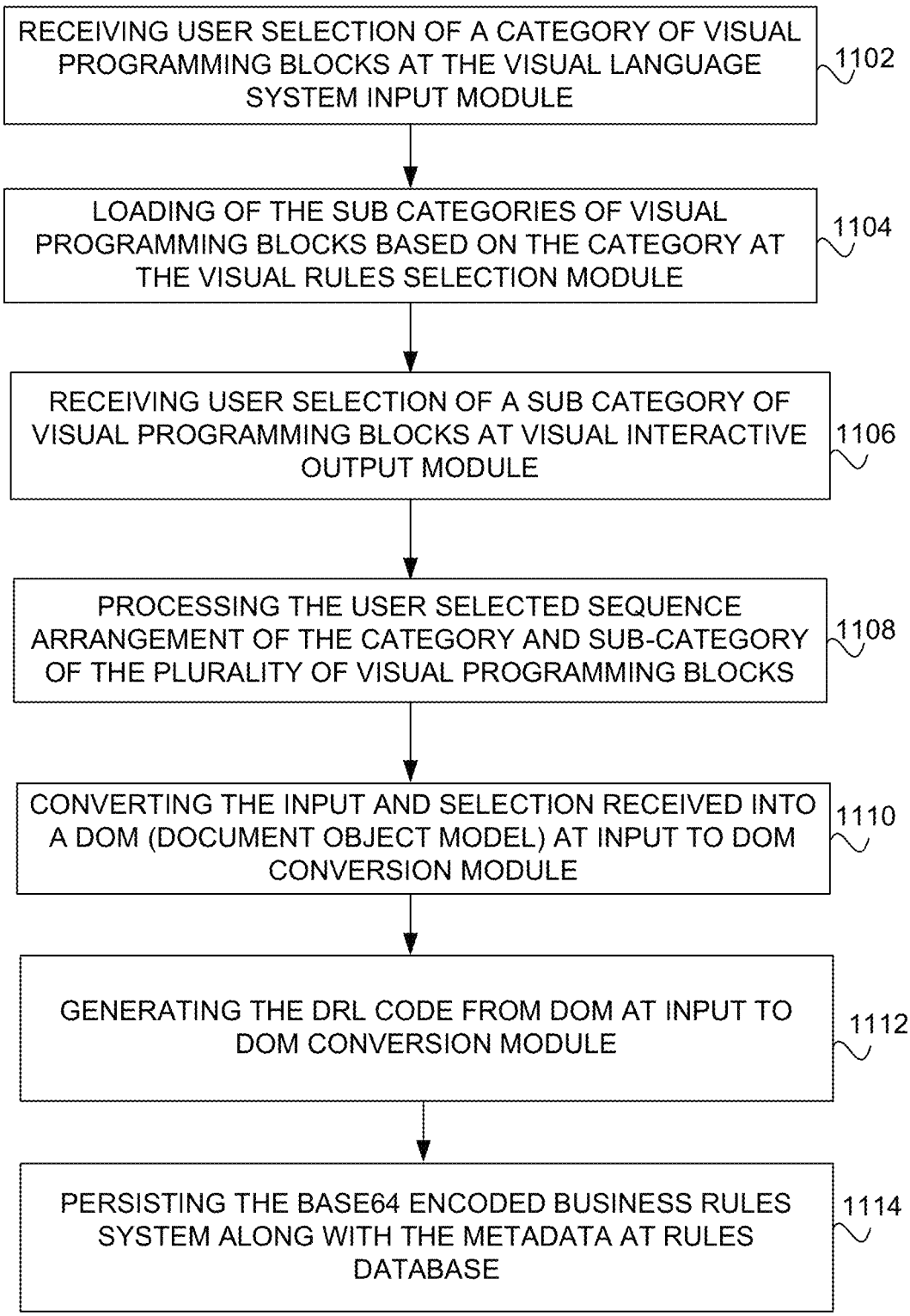
FIG. 11 is a flow diagram that illustrates a method of visual language programming according to an embodiment herein.

FIG. 11 is a flow diagram that illustrates a method of setting the rules in the visual language according to an embodiment herein. The method includes, at step 1102, receiving user selection of a category of visual programming blocks from the plurality of categories of the visual programming blocks at the visual language system input module, wherein the user selects the input from multiple selectable categories. The method includes, at step 1104, loading of sub categories of the visual programming blocks based on the category at visual rules selection module. The method includes, at step 1106, receiving user selection of a sub category of visual programming blocks at visual interactive output module 204. The method includes, at step 1108, processing the user selected sequence of arrangement of the category and the sub category of the plurality of the visual programming blocks. The method includes, at step 1110, converting the input and selection received of the visual language block arrangement into document object model (DOM) at the input to DOM conversion module. The method includes, at step 1112, generating drl code from DOM. The method includes, at step 1114, persisting the base64 encoded drl along with the metadata into the rules database 112.

Figure 12:
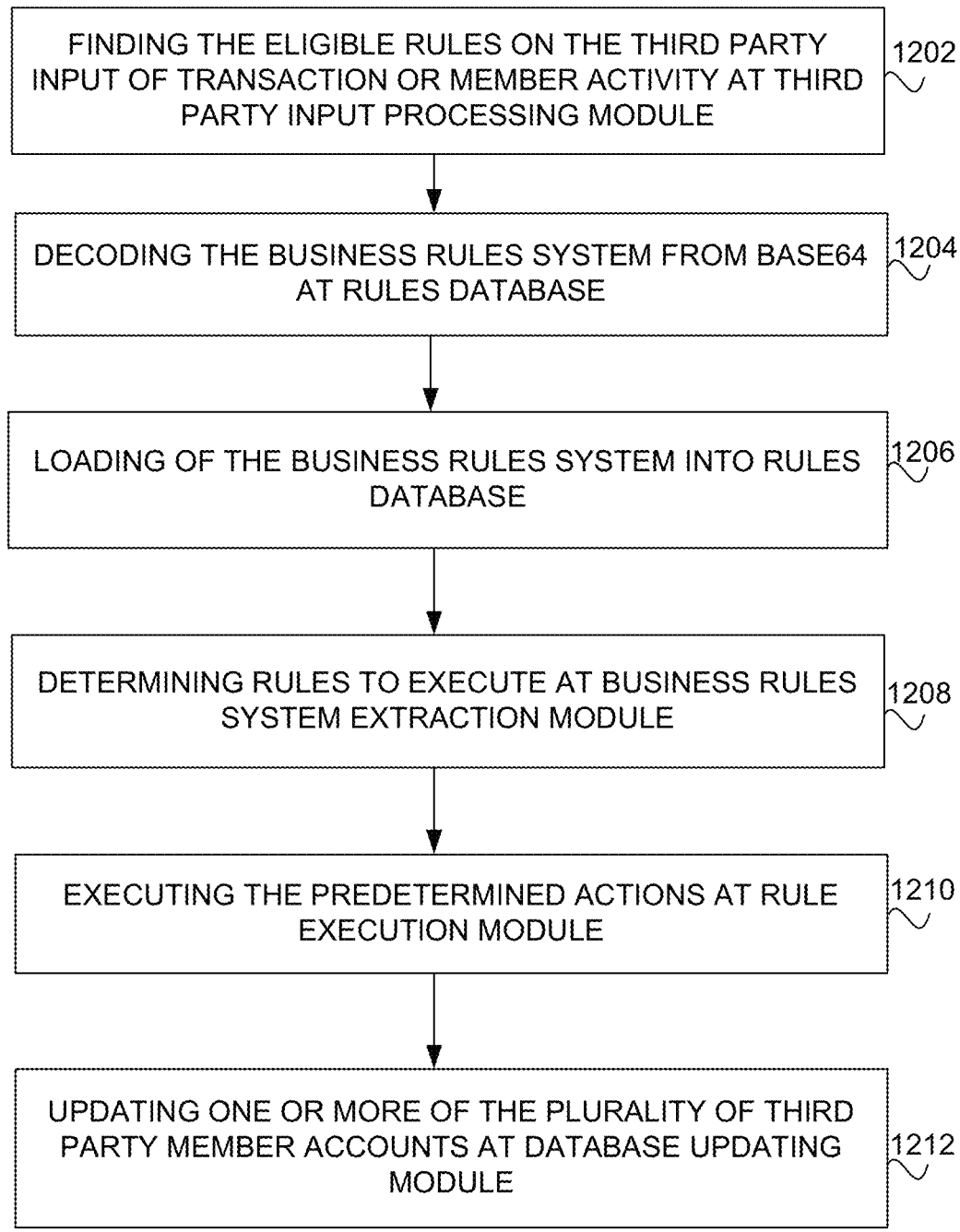
FIG. 12 is a flow diagram that illustrates a method of activating the prescribed rules according to an embodiment herein.

FIG. 12 is a flow diagram that illustrates a method of activating the prescribed rules according to an embodiment herein. The method includes, at step 1202, finding the eligible offer rules for the activity and the member at third-party input processing module on the input of member or member activity or a transaction from a plurality of member base. The method includes, at step 1204, decoding the Business rules system (drl) from base64 at the rules database 112. The method includes, at step 1206, loading the business rules system into the rules database 112. The method includes, at step 1208, determining the offer rules to execute the actions at business rules system rules extraction module. The method includes, at step 1210, executing the corresponding programmed actions at rules execution module. The method includes, at step 1212, updating the one or more of the plurality of member user accounts with the resultant change in the member profile at database updating module. For example, updating points or adding an attribute.

Figure 13:
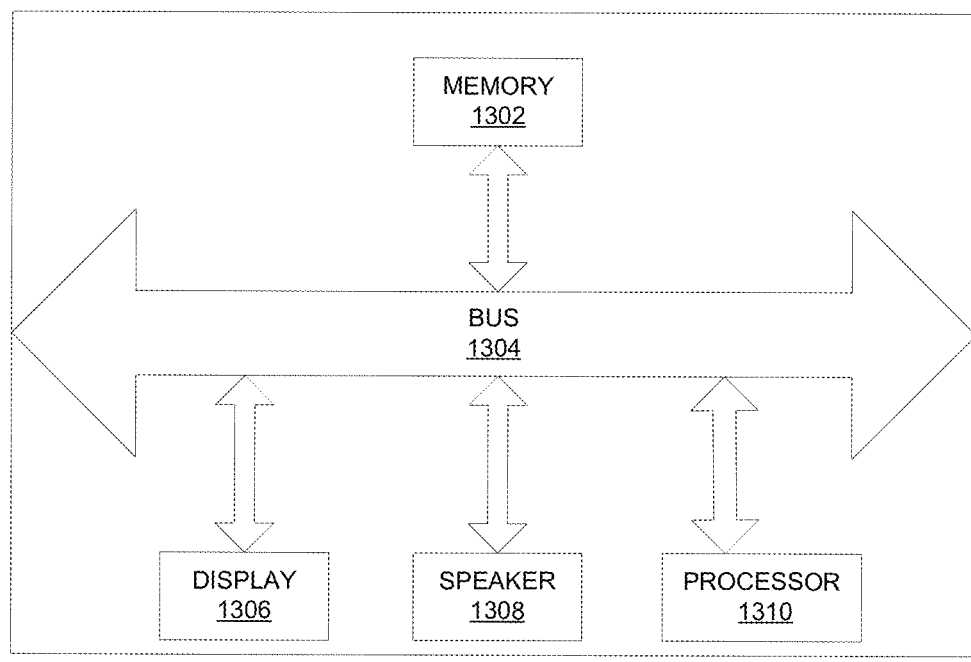
FIG. 13 illustrates an exemplary view of an exploded view of the user device of FIG. 1 according to the embodiments herein.

FIG. 13 illustrates an exemplary view of an exploded view of the user device 104 of FIG. 1 according to the embodiments herein. The user device 104 having a memory 1302 having a set of computer instructions, a bus 1304, a display 1306, a speaker 1308, and a processor 1310 capable of processing a set of instructions to perform any one or more of the methodologies herein, according to an embodiment herein. The processor 1310 may also enable digital content to be consumed in the form of a video for output via one or more displays 1306 or audio for output via speaker and/or earphones 1308. The processor 1310 may also carry out the methods described herein and in accordance with the embodiments herein.

The embodiments herein can take the form of, an entire hardware embodiment, an entire software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the currently available types of network adapters.

Figure 14:
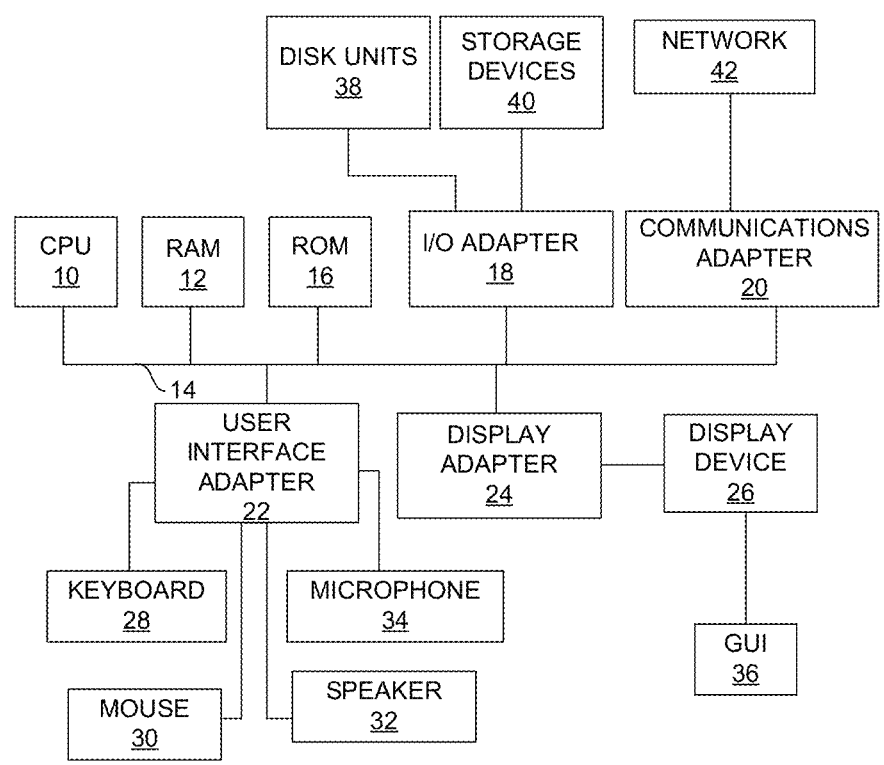
FIG. 14 illustrates a representative hardware environment for practicing the embodiments herein.

A representative hardware environment for practicing the embodiments herein is depicted in FIG. 14. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The user selectable visual programming blocks may be extended with additional blocks to support continuously evolving processes and policies according to user's requirement. The visual programming blocks are designed such that user may use multiple visual programming blocks in optimal way on a single interface, thereby greatly enhancing the user experience. Exporting and importing the rule definition happens seamlessly from the test to production environment. Setting the rules with the visual programming blocks is extremely simple, fun and doesn't require programming literacy. Also, rules may be set in real time. Also, there is automatic update of any transactions or predetermined actions of the client base and rules are activated automatically. It greatly enhances user's experience and enables experimentation due to very short time investment in setting up rules.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope.

What is claimed is:

1. A processor-implemented method for facilitating visual programming by a user via a visual interface of a user device, the method comprising the steps of:
   providing a visual programming window for receiving a user selection on the visual interface of the user device, wherein the user selection includes a category of visual programming blocks out of a plurality of categories and a selection of a plurality of sub-categories of the visual programming blocks from a plurality of selectable sub-categories of the visual programming blocks, wherein each of the visual programming block is associated to a template program that translates one or more characteristics of the visual programming block to a domain specific language;
   receiving the user selection comprising at least one of (i) the category of visual programming block or (ii) a sub-category from among the plurality of selectable sub-categories of the visual programming blocks, wherein each of the plurality of sub-categories is associated with at least one rule from a rules database;
   parsing the user selection of (i) the category of visual programming block and (ii) the sub-category of the visual programming blocks, wherein the category of visual programming blocks and the sub-category of the visual programming blocks are processed in a user selected sequence arrangement of the visual programming blocks, wherein the user selected sequence arrangement is associated to a sequence template program;
   recursively executing the template program associated with the visual programming block to generate one or more domain specific language code;
   combining the one or more domain specific language code by executing the sequence template program associated with the category of the visual programming blocks; and
   generating a rules program at the rules database comprising the category and the sub-categories of rules from the rules database based on the one or more domain specific language code, wherein the rules program is based on the user selected sequence arrangement of the visual programming blocks at the visual programming window.

2. The processor-implemented method of claim 1, wherein the visual programming block is enabled to receive at least one of (i) a user input (ii) a user selection from selectable options, wherein the user input or the user selection is transferred to the template program for the sub-category of the visual programming block.

3. The processor-implemented method of claim 1, wherein the user selected sequence arrangement of the visual programming blocks comprises at least one of (a) a category to a sub-category arrangement, (b) a sub-category to a category arrangement, and (c) a sub-category to a sub-category arrangement, of the plurality of the visual programming blocks.

4. The processor-implemented method of claim 1, wherein the user selection at the visual programming window is converted to a business rules system using a server side scripting language and is saved at the rules database.

5. The processor-implemented method of claim 1 further comprising:
   at least one of (i) receiving at least one action performed on a member data set, (ii) at least one condition set using the visual programming block that applies on at least one member from the member dataset; and
   automatically executing the rules program, wherein the at least one rule from the rules database is associated to the at least one action performed on the member data set, wherein the member data set comprises a plurality of member user accounts associated with a plurality of member user devices.

6. The processor-implemented method of claim 5, wherein each of the plurality of member user accounts comprises at least one of (1) a predetermined personal information (2) a bank transaction performed on a member user device associated with the visual programming blocks that is selected by the user, and (3) an online action performed at the member user device on one or more of social media platforms.

7. The processor-implemented method of claim 5, wherein the at least one action on the member data set comprise one or more of (i) attributing a value to an action performed at each of the plurality of member user accounts based on the at least one rule from the rules database, (ii) attributing a value to a transaction performed at each of the plurality of member user accounts based on the at least one rule from the rules database, (iii) updating the member data set based on at least one of: the action or the attributed transaction value in the plurality of member user accounts, (iv) activating a communication with at least one member user device from among the plurality of the member user devices according to the at least one rule from the rules database, or (v) making a transaction on the at least one member device.

8. The processor-implemented method of claim 1, wherein the at least one rule from the rules database associated with the user selection comprises a category associated with a programming application.

9. The processor-implemented method of claim 1, wherein the visual programming block sets a condition to determine a rule to be present or absent in the rules program for a member dataset.

10. The processor-implemented method of claim 1, wherein the plurality of selectable sub-categories of the visual programming blocks is programmed to automatically mutate based on the user selection of the category of the visual programming blocks.

11. The processor-implemented method of claim 1, wherein the plurality of selectable sub-categories of the visual programming blocks is programmed to automatically mutate based on the user selection of a sub-category from the plurality of selectable sub-categories of the visual programming blocks.

12. The processor-implemented method of claim 1, wherein the visual programming block is programmed to accept at least one input from (i) a numeral value input from the user, (ii) a text input from the user, (iii) a Boolean input, (iv) a vector input, (v) a look-up input, (vi) a date input, or (vii) a limit of validity.

13. The processor-implemented method of claim 1, wherein the user selection of the visual programming block sets a rule and executes at least one action based on the rule in real-time.

14. The processor-implemented method of claim 1, wherein the visual programming block is supplemented with additional visual programming blocks based on an input by the user at the visual programming window.

15. The processor-implemented method of claim 1, wherein a right click on the visual programming block duplicates that visual programming block at the visual programming window.

16. The processor-implemented method of claim 1, wherein the visual programming blocks perform smart mutation.

* * * * *